US012581115B2

(12) United States Patent　　　　(10) Patent No.:　US 12,581,115 B2
Tian et al.　　　　　　　　　　　　(45) Date of Patent:　　Mar. 17, 2026

(54) GROUPING OF DUPLICATE VERTICES IN POSITION COMPRESSION

(71) Applicant: TENCENT AMERICA LLC, Palo Alto, CA (US)

(72) Inventors: Jun Tian, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 4 days.

(21) Appl. No.: 18/587,404

(22) Filed: Feb. 26, 2024

(65) Prior Publication Data

US 2024/0292028 A1　　Aug. 29, 2024

Related U.S. Application Data

(60) Provisional application No. 63/448,614, filed on Feb. 27, 2023.

(51) Int. Cl.
*H04N 19/597*　　(2014.01)
*H04N 19/70*　　(2014.01)

(52) U.S. Cl.
CPC ........... *H04N 19/597* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2019/0318547 A1 | 10/2019 | Powers et al. | |
| 2020/0058164 A1* | 2/2020 | Sarup ...................... | G06T 19/00 |
| 2021/0407144 A1* | 12/2021 | Ramasubramonian ...................... | |
| | | | G06T 17/20 |
| 2022/0164994 A1* | 5/2022 | Joshi ...................... | G06T 9/001 |

OTHER PUBLICATIONS

International Search Report issued Jun. 17, 2024 in International Application No. PCT/US 24/17467.
Written Opinion issued Jun. 17, 2024 in International Application No. PCT/US 24/17467.
Jianfeng Xu et al., "On improving motion vector coding by integrating duplicated vertices in reference frames," International Organisation for Standardisation Organisation Internationale De Normalisation ISO/IEC JTC 1/SC 29/WG 7 Coding of Moving Pictures and Audio, Oct. 2022, ISO/IEC JTC 1/SC 29/WG 7 m61048, pp. 1-5 (5 pages total).

* cited by examiner

*Primary Examiner* — Christopher Braniff
(74) *Attorney, Agent, or Firm* — Sughrue Mion, PLLC

(57)　　　　ABSTRACT

Method, apparatus, and system for video encoding are provided. The process may include receiving volumetric data of at least one three-dimensional (3D) content. The process may also include determining a first collection of one or more duplicate vertices in a first frame of the volumetric data using a mapping function and then determining a second collection one or more non-skippable duplicate vertices among the first collection. In some embodiments, the one or more duplicate vertices comprises vertex indices of vertices in the first frame may have same mapping as respective vertices in a reference frame. In some embodiments, the second collection may include indices of the one or more non-skippable duplicate vertices with respect to positions of the respective vertices in the first collection. The process may include signaling the second collection and a number of vertices in the second collection.

20 Claims, 6 Drawing Sheets

Figure 3:
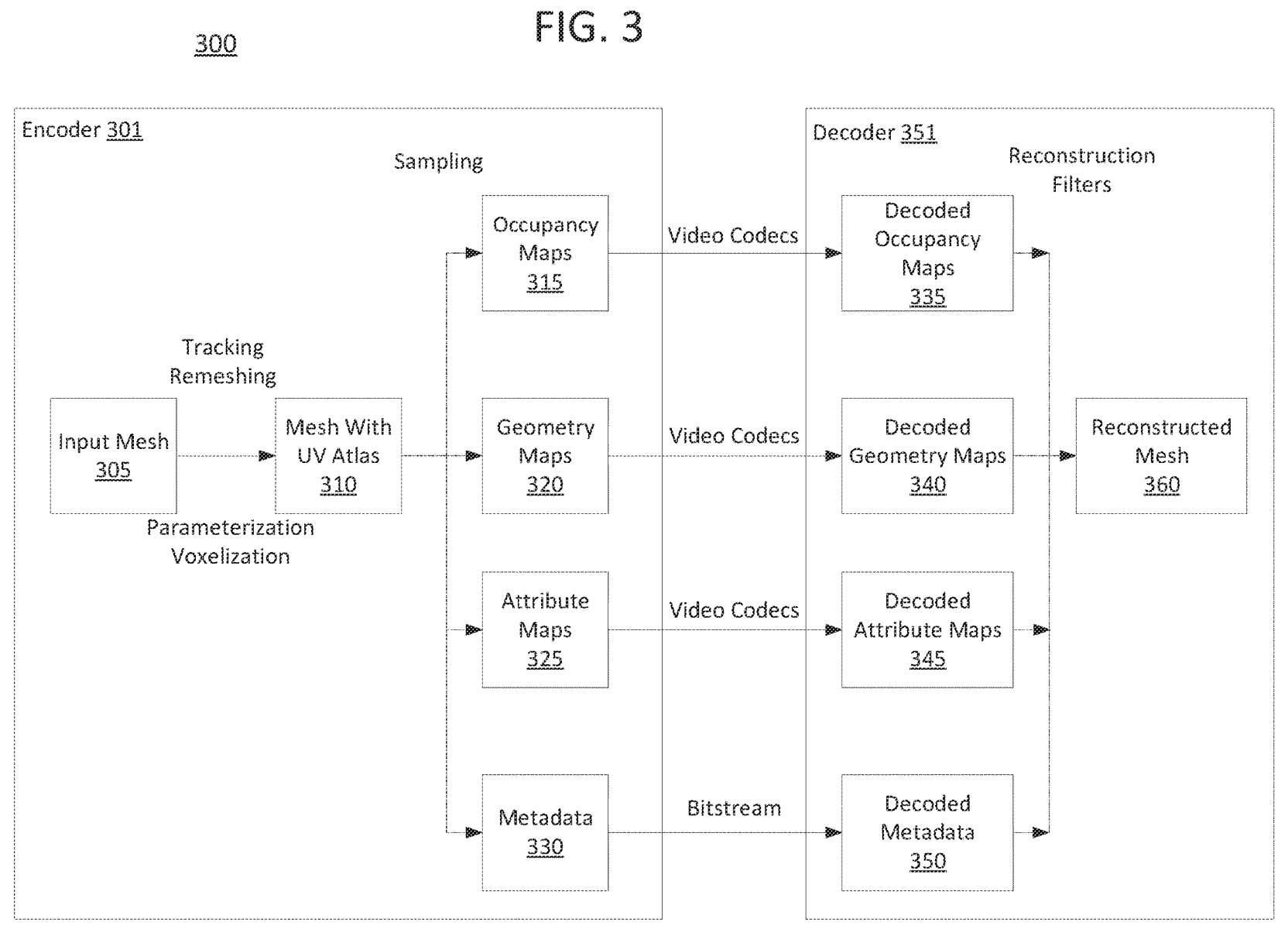

Encoder 301

Input Mesh 305

Tracking Remeshing

Mesh With UV Atlas 310

Parameterization Voxelization

Sampling

Occupancy Maps 315

Geometry Maps 320

Attribute Maps 325

Metadata 330

Video Codecs

Video Codecs

Video Codecs

Bitstream

Decoder 351

Reconstruction Filters

Decoded Occupancy Maps 335

Decoded Geometry Maps 340

Decoded Attribute Maps 345

Decoded Metadata 350

Reconstructed Mesh 360

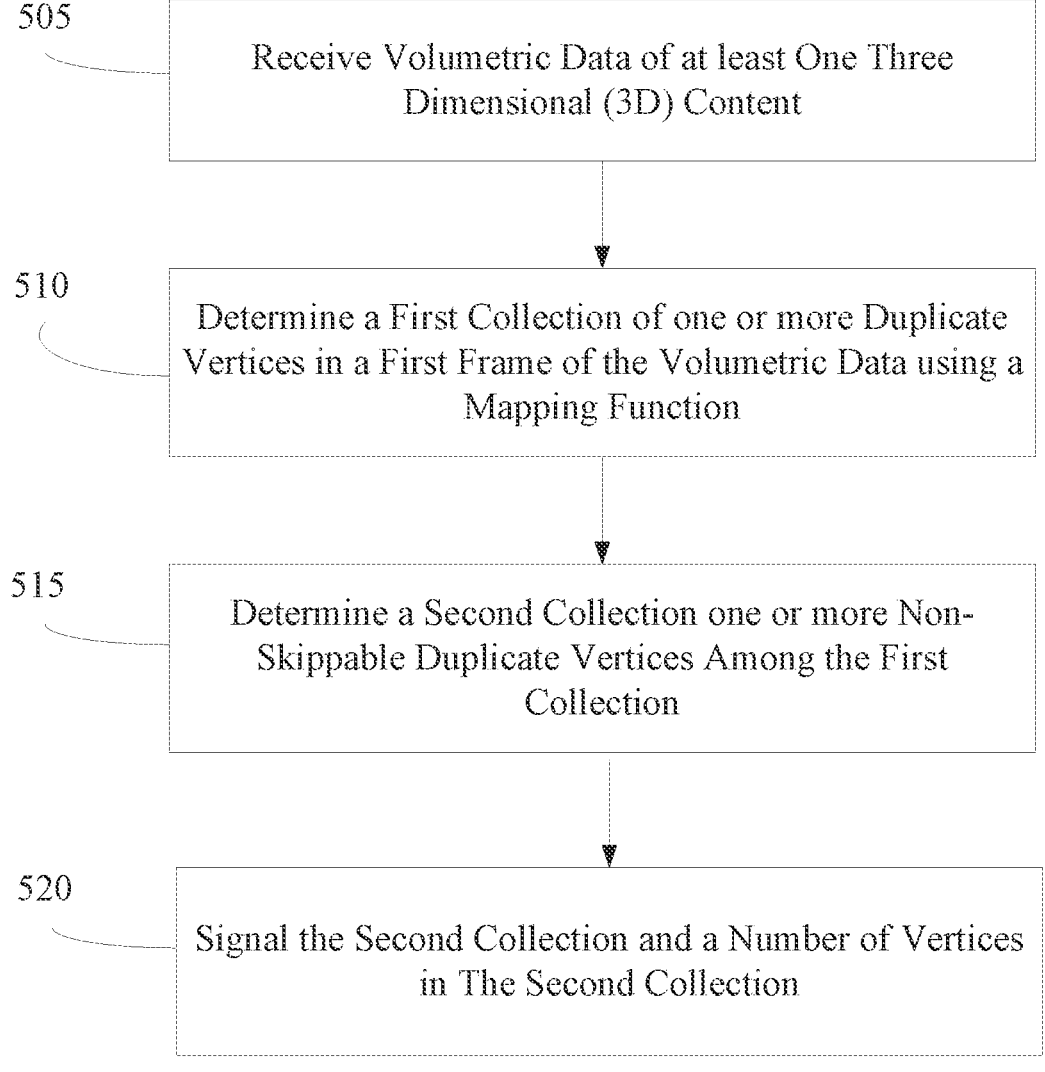

505 — Receive Volumetric Data of at least One Three Dimensional (3D) Content

510 — Determine a First Collection of one or more Duplicate Vertices in a First Frame of the Volumetric Data using a Mapping Function 515 — Determine a Second Collection one or more Non-Skippable Duplicate Vertices Among the First Collection 520 — Signal the Second Collection and a Number of Vertices in The Second Collection

GROUPING OF DUPLICATE VERTICES IN POSITION COMPRESSION

CROSS-REFERENCE TO RELATED APPLICATION

This application claims priority from U.S. Provisional Application No. 63/448,614, filed on Feb. 27, 2023, the disclosure of which is incorporated herein by reference in its entirety.

FIELD

This disclosure is directed to a set of advanced video coding technologies. More specifically, the present disclosure is directed to methods and systems of mesh vertex position compression using duplicate vertices.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A mesh may be composed of several polygons that describe the surface of a volumetric object. Each polygon may be defined by its vertices in 3D space and the information of how the vertices are connected, referred to as connectivity information. Such mapping is usually described by a set of parametric coordinates, referred to as XYZ coordinates. In some embodiments, vertex attributes, such as colors, normals, etc., could also be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps may be used to store high resolution attribute information such as texture, normals, displacements etc. Such information could be used for various purposes such as texture mapping and shading.

A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to embodiments, a method, apparatus, and a non-transitory computer-readable medium stores computer instructions for a process video encoding may be provided.

According to an embodiment, the process may include receiving volumetric data of at least one three-dimensional (3D) content; determining a first collection of one or more duplicate vertices in a first frame of the volumetric data using a mapping function, wherein the one or more duplicate vertices comprises vertex indices of vertices in the first frame that have same mapping as respective reference vertices in a reference frame; determining a second collection one or more non-skippable duplicate vertices among the first collection, wherein the one or more non-skippable duplicate vertices comprises vertices among the first collection that do not have same positions in the first frame and the reference frame, and wherein the second collection comprises indices of the one or more non-skippable duplicate vertices with respect to positions of the respective vertices in the first collection; and signaling the second collection and a number of vertices in the second collection.

According to an embodiment, the apparatus may include at least one memory configured to store program code; and at least one processor configured to read the program code and operate as instructed by the program code. The program code may include receiving code configured to cause the at least one processor to receive volumetric data of at least one three-dimensional (3D) content; first determining code configured to cause the at least one processor to determine a first collection of one or more duplicate vertices in a first frame of the volumetric data using a mapping function, wherein the one or more duplicate vertices comprises vertex indices of vertices in the first frame that have same mapping as respective reference vertices in a reference frame; second determining code configured to cause the at least one processor to determine a second collection one or more non-skippable duplicate vertices among the first collection, wherein the one or more non-skippable duplicate vertices comprises vertices among the first collection that do not have same positions in the first frame and the reference frame, and wherein the second collection comprises indices of the one or more non-skippable duplicate vertices with respect to positions of the respective vertices in the first collection; and signaling code configured to cause the at least one processor to signal the second collection and a number of vertices in the second collection.

According to an embodiment, non-transitory computer-readable medium storing instructions may include one or more instructions that, when executed by one or more processors of a device for video encoding, cause the one or more processors to receive volumetric data of at least one three-dimensional (3D) content; determine a first collection of one or more duplicate vertices in a first frame of the volumetric data using a mapping function, wherein the one or more duplicate vertices comprises vertex indices of vertices in the first frame that have same mapping as respective reference vertices in a reference frame; determine a second collection one or more non-skippable duplicate vertices among the first collection, wherein the one or more non-skippable duplicate vertices comprises vertices among the first collection that do not have same positions in the first frame and the reference frame, and wherein the second collection comprises indices of the one or more non-skippable duplicate vertices with respect to positions of the respective vertices in the first collection; and signal the second collection and a number of vertices in the second collection.

BRIEF DESCRIPTION OF THE DRAWINGS

Further features, the nature, and various advantages of the disclosed subject matter will be more apparent from the following detailed description and the accompanying drawings in which:

FIG. 3 is a schematic illustration of a simplified block diagram of a video encoder and decoder, in accordance with embodiments of the present disclosure.

FIG. 5 is an exemplary flow diagram illustrating a process for video encoding, in accordance with embodiments of the present disclosure.

DETAILED DESCRIPTION

A mesh may include several polygons that describe the surface of a volumetric object. As stated above, mesh geometry information consists of vertex connectivity information, 3D coordinates, and texture coordinates, etc.

According to an aspect of the present disclosure, methods, systems, and non-transitory storage mediums for parallel processing of dynamic mesh compression are provided. Embodiments of the present disclosure may also be applied to static meshes.

Figure 1:
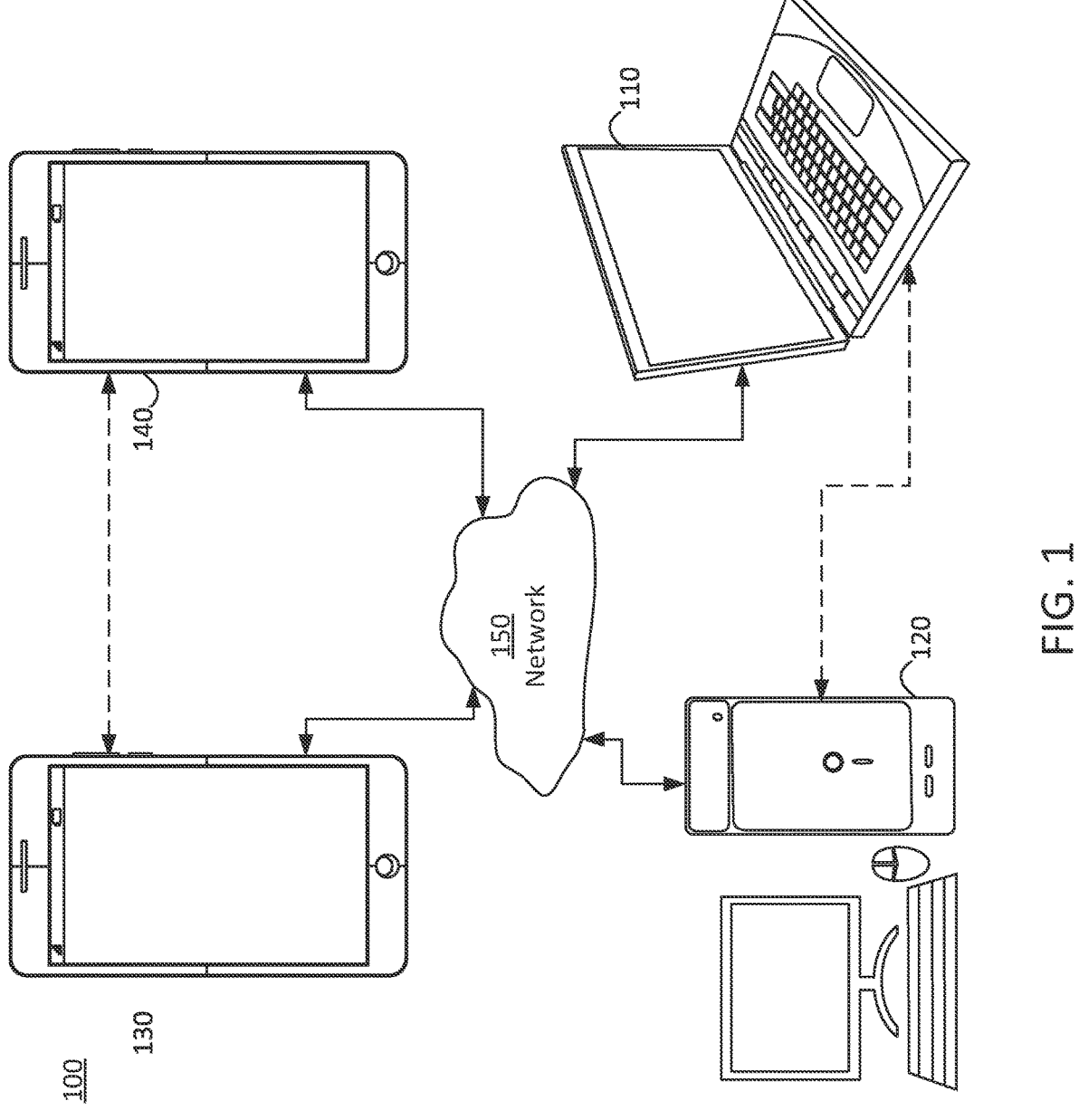
FIG. 1 is a schematic illustration of a simplified block diagram of a communication system, in accordance with embodiments of the present disclosure.
Figure 2:
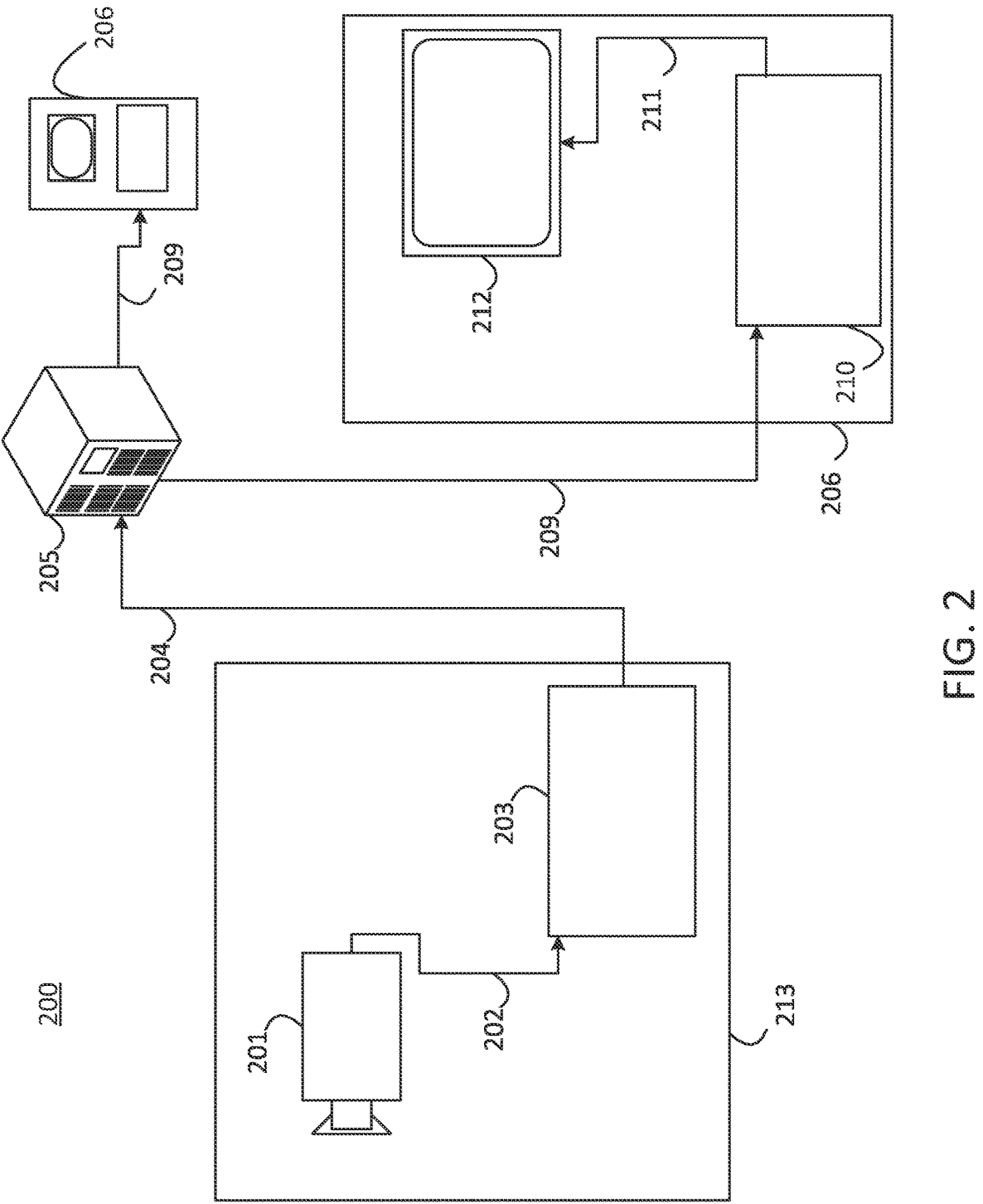
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 351 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

In embodiments of the present disclosure, a dynamic mesh sequence M at a time instance t as M(t). M(t) may be known as a positionally tracked frame. In embodiments where there is a mapping f from the vertex positions of M(t) to the vertex positions at another time instance $M(t_0)$, where t and to are different time instances, $M(t_0)$ may be the reference frame, and the corresponding vertices in the reference frame may be known as reference vertices.

For a vertex V in a positionally track frame M(t), its neighbors are vertices that are connected to V through edges, and these vertices are called neighbor vertices of V.

For a positionally track frame M(t) and its reference frame M(t0), assume f is the mapping between vertex positions of M(t) and M(t0). Given a vertex V in M(t), we say V is a duplicate vertex if there is a coded vertex $\overline{V}$ in M(t) such that their reference vertices, f(V) and f($\overline{V}$), have the same position values. A coded vertex implies that the coding order of $\overline{V}$ comes prior to V. Assume subscripts x, y, z denoting 3D coordinates in the xyz space, then for a duplicate vertex V, we have $(f(V))_x=(f(\overline{V}))_x$, $(f(V))_y=(f(\overline{V}))_y$, and $(f(V))_z=(f(\overline{V}))_z$.

For a duplicate vertex V, we say V is a skippable duplicate if V and $\overline{V}$ have the same position values, $V_x=\overline{V}_x$, $V_y=\overline{V}_y$, and $V_z=\overline{V}_z$; otherwise, we say V is a non-skippable duplicate.

In general, a skippable vertex may be inferred from using the already coded vertex in the duplicated pair. A non-skippable vertex needs to be signaled directly.

Figure 4:
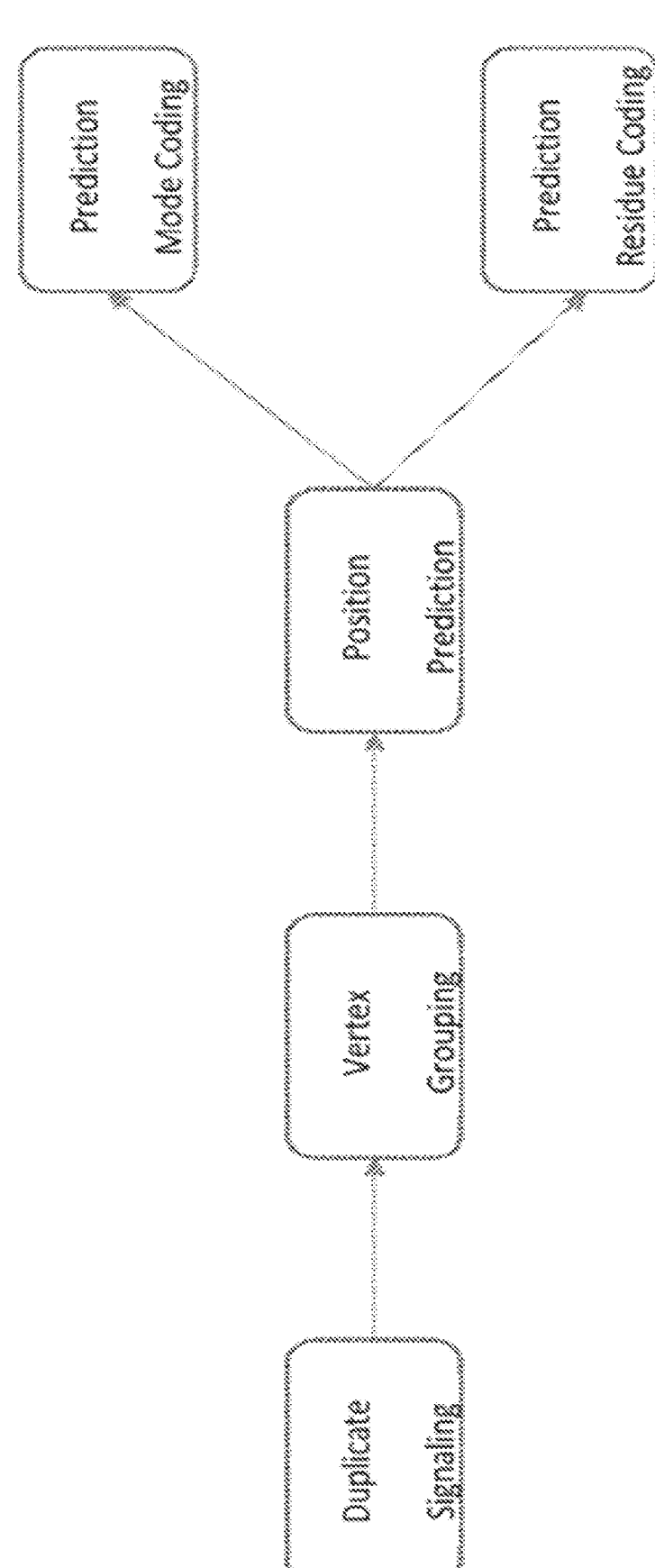
FIG. 4 is an exemplary illustration a process for vertex position compression, in accordance with embodiments of the present disclosure.

FIG. 4 is an illustration of diagram 400 indicating vertex position compression methods, according to embodiments of the present disclosure. As shown in FIG. 4, proposed vertex position compression methods include: duplicate signaling, grouping vertices, calculation of position prediction, position prediction mode coding, and position prediction residue coding.

Duplicate Signaling

For a positionally tracked frame M(t), duplicate vertices may be identified using the reference frame $M(t_0)$. Let D be the collection of duplicate vertices, $D=\{d_1, d_2, \ldots, d_s\}$, where $0 \le d_1 < d_2 < \ldots < d_s \le T-1$, $d_i$ may the vertex index of the i-th duplicate, $s \ge 0$ may be the number of duplicates, and $T \ge 3$ may be the number of vertices of M(t). For example, $D=\{14, 32, 36, 41, 69, 86\}$ may imply that the $14^{th}$, $32^{nd}$, $36^{th}$, $41^{st}$, $69^{th}$, and $86^{th}$ vertices are duplicates.

For each duplicate vertex, it may either a skippable duplicate or a non-skippable duplicate. Let NS be the collection of non-skippable duplicates.

In one embodiment, NS may represented by the indices in the duplicate collection D, $NS=\{n_1, n_2, \ldots, n_r\}$, where $0 \le n_1 < n_2 < \ldots < n_r \le s-1$, $n_j$ may the index of the j-th non-skippable duplicate in D, and $r \ge 0$ may be the number of non-skippable duplicates. In the example of $D=\{14, 32, 36, 41, 69, 86\}$, if $NS=\{2, 3\}$, then the $2^{nd}$ and $3^{rd}$ duplicates are non-skippable, i.e., the $36^{th}$ and $41^{st}$ vertices are non-skippable duplicate. (Note that the index starts from 0 instead of 1.)

The encoder codes the number r and each index $n_j$ for duplicate signaling.

In one embodiment, the number r may be coded using a variable length coding.

In another embodiment, the number r may be coded using a fixed length coding.

In one embodiment, the number r may be coded using a fixed length code of (b+1)-bits, where b may be the largest integer less than or equal to $\log_2(s)$. The number r may be coded using one fixed length code.

In another embodiment, the number r may be coded using a fixed length code where the code length may be smaller than (b+1)-bits, where b may be the largest integer less than or equal to $\log_2(s)$. As r may be coded using more than one fixed length code, the first bit (or last bit) in the fixed length code will signal whether it may be a representation of a new symbol or a continuation of the last symbol.

The non-skippable duplicate index $n_j$ can be coded using differential coding. Define $N_1=n_1$, and for $j \ge 2$, $N_j=n_j-n_{j-1}-1$. The encoder codes $N_j$, $j \ge 1$, for non-skippable duplicate indices.

In one embodiment, $N_j$ may be coded using a variable length coding.

In one embodiment, $N_j$ may be coded using an Exp-Golomb code.

In another embodiment, $N_j$ may be coded using a fixed length coding.

In one embodiment, $N_j$ may be coded using a fixed length code of (B+1)-bits, where B may be the largest integer less than or equal to $\log_2(s-2)$. The value $N_j$ may be coded using one fixed length code.

In another embodiment, $N_j$ may be coded using a fixed length code where the codelength may be smaller than (B+1)-bits, where B may be the largest integer less than or equal to $\log_2(s-2)$. As $N_j$ may be coded using more than one fixed length code, the first bit (or last bit) in the fixed length code will signal whether it may be a representation of a new symbol or a continuation of the last symbol.

An alternative embodiment may be to signal vertex indices of skippable duplicates.

Further, the encoder can adaptively turn on or turn off duplicate signaling.

In one embodiment, the adaptive decision of turning on or turning off duplicate signaling may be based on vertex statistics.

In one embodiment, the adaptive decision of turning on or turning off duplicate signaling may be based on the number of duplicate vertices. If the number of duplicate vertices may be larger than or equal to a threshold, duplicate signaling may be turned on; otherwise, it may be turned off.

In another embodiment, the adaptive decision of turning on or turning off duplicate signaling may be based on the number of vertices, T. If the number of vertices may be larger than or equal to a threshold, duplicate signaling may be turned off; otherwise, it may be turned on.

Yet in another embodiment, the adaptive decision of turning on or turning off duplicate signaling may be based on the ratio between the number of duplicate vertices and the number of vertices. If the ratio may be larger than or equal to a threshold, duplicate signaling may be turned on; otherwise, it may be turned off.

Grouping of Vertices

The vertices of a positionally tracked frame M(t) may be partitioned into groups, where each group may contain K vertices, and K may be a constant. For example, vertices may be partitioned into groups of 16 vertices with K=16. For another example, if K=1, then each group may contain one vertex. For another example, if K is equal to the number of vertices of a frame M(t), then all vertices are in the same group.

In one embodiment, skippable duplicates may be skipped in grouping. For example, for a grouping of 16 vertices, if the first 18 vertices have 2 skippable duplicates, then the first group will consist of vertices from index 0 to 17, with the 2 skippable duplicates removed.

In another embodiment, skippable duplicates may be skipped in grouping, and all non-skippable duplicates may be grouped in a special collection, a non-skippable duplicate collection. The non-skippable duplicate collection may be placed prior to groups of non-duplicate vertices. The non-skippable duplicate collection may be placed after groups of non-duplicate vertices. The non-skippable duplicate group may be further partitioned into groups, where each group may contain K' non-skippable duplicate vertices. The group size K' may be equal to K, the size of non-duplicate vertices group. The group size K' may be different from K. The group size K' may be equal to 1, where all non-skippable duplicates are placed into one group.

Yet in another embodiment, all vertices may be considered in grouping, including skippable duplicates.

Vertex Position Prediction

For a vertex V in a group G of a positionally track frame M(t), its position may be estimated by the position of the reference vertex f(V) in the reference frame, where f is the mapping between M(t) and the reference frame. The estimation error E may be the difference between the positions of V and f(V)

$$E = V - f(V)$$ Eqn (1)

As each vertex may have 3D coordinates, the above equation may compute each coordinate component-wise, i.e., $$E_x = V_x - (f(V))_x$$ Eqn (2)

$$E_y = V_y - (f(V))_y$$ Eqn (3)

-continued $$E_z = V_z - (f(V))_z$$ Eqn (4)

For a vertex V in a group G of a positionally track frame M(t), its position may be estimated by the position The estimation error E may be predicted from the neighbors of the vertex V. For a neighbor vertex of V, if it has been coded, we may use the neighbor vertex's estimation error to predict E.

Assume V has N neighbor vertices $V_1, V_2, \ldots, V_N$ that have been coded and may be used for prediction. For a neighbor vertex $V_i$, its estimation error $E_i = V_i - f(V_i)$, for i=1, 2, ..., N.

We define the average of these predicted values $E_0$ as $$E_0 = (E_1 + E_2 + \ldots + E_N)/N$$ Eqn (5)

For a group G, the encoder estimates the coding cost of two approaches:

C0: coding estimation error E of all vertices

C1: coding estimation residue $(E - E_0)$ of all vertices

If the coding cost of C0 is less than or equal to C1, then for the group G, its prediction mode is 0, and the prediction residues are set to be the estimation errors E of all vertices.

If the coding cost of C0 is greater than C1, then for the group G, its prediction mode is 1, and the prediction residues are set to be the estimation residue $(E - E_0)$ of all vertices.

Prediction Mode Coding

The prediction mode (which may be a binary digit, 0, or 1) of a group G, may be coded.

In one embodiment, the prediction mode may be coded using entropy coding.

In one embodiment, the prediction mode may be coded using arithmetic coding.

In one embodiment, the prediction mode may be coded using a context based arithmetic coding.

In one embodiment, the prediction mode may be coded using a spatial context based arithmetic coding, where the context may be conditioned on previous coded groups of the same frame.

When the prediction modes in the reference frame are already coded and are available, prediction modes of groups in the frame M(t) may be coded using temporal context. As each vertex has a reference vertex, there may be also a one-to-one association between groups of a positionally tracked frame and its reference frame. We call the associated group in the reference frame as the reference group.

In one embodiment, the XOR (Exclusive OR) of the prediction mode of a group G and the prediction mode of the reference group may be coded. Thus if the group G and the reference group have the same prediction modes, their XOR, which may be 0, may be coded. If the group G and the reference group have different prediction modes, their XOR, which may be 1, may be coded.

In another embodiment, a binary flag (which will be 0 or 1) representing whether the group G and its reference group have the same prediction mode may be coded. Thus if the group G and the reference group have the same prediction mode, a binary digit 1 may be coded. If the group G and the reference group have different prediction mode, a binary digit 0 may be coded.

In another embodiment, the prediction mode of a group G in a positionally track frame M(t) may be coded using a temporal context based arithmetic coding, where the context may be the prediction mode of the reference group.

Prediction Residue Coding

The prediction residue may be coded.

The prediction residue may be coded using, say fixed length coding, exponential-Golomb coding, arithmetic coding, etc.

The prediction residue may be go through a compactization transform, such as a fast Fourier transform (FFT), a discrete cosine transform (DCT), a discrete sine transform (DST), a discrete wavelet transform (DWT), etc. The output from the compactization transform will be coded using, say fixed length coding, exponential-Golomb coding, arithmetic coding, etc.

Embodiments disclosed herein provide for more efficient ways to encode and decode mesh data by providing a more efficient way to signal NS duplicates. As an example, embodiments relate to improving efficiency based on determining skippable vs. non-skippable duplicate vertices and signaling only the non-skippable duplicate vertices. It enables a smaller range of lambda.

The embodiments as disclosed herein may be used separately or combined in any order. Further, each of the methods (or embodiments), encoder, and decoder may be implemented by processing circuitry (e.g., one or more processors or one or more integrated circuits). In one example, the one or more processors execute a program that may be stored in a non-transitory computer-readable medium.

Embodiments of the present disclosure relate to a number of methods and systems are proposed for vertex position compression. Note that they can be applied individually or by any form of combinations. They can be applied to encoding or decoding, as revised by a person skilled in the art. Further, the disclosed methods and systems are not limited to vertex position compression. They can also be applied to, for example, 2D texture coordinate compression, as a more general temporal prediction based scheme.

FIG. 5 is a flow diagram illustrating a process 600 for texture coordinate prediction for mesh compression.

At operation 505, volumetric data of at least one three-dimensional (3D) content may be received. In some embodiments the volumetric data may include 3D meshes and vertices in 3D space.

At operation 510, a first collection of one or more duplicate vertices in a first frame of the volumetric data may be determined using a mapping function. In some embodiments, the one or more duplicate vertices may include vertex indices of vertices in the first frame that have same mapping as respective vertices in a reference frame.

At operation 515, a second collection one or more non-skippable duplicate vertices among the first collection may be determined. In some embodiments, the one or more non-skippable duplicate vertices may include vertices among the first collection that do not have same positions in the first frame and the reference frame. In some embodiments, the second collection may include indices of the one or more non-skippable duplicate vertices with respect to positions of the respective vertices in the first collection.

At operation 520, the second collection and a number of vertices in the second collection may be signaled.

In some embodiments, the number of vertices in the second collection is coded using fixed length coding. The fixed length may be a length of b+1 bits, wherein b is an integer less than, equal to, or greater than $\log_2(s)$, wherein s is the number of vertices in the first collection.

In some embodiments, the second collection is coded using fixed length coding. The fixed length of the second collection may be a length of B+1 bits, wherein B is an integer less than, equal to, or greater than $\log_2(s-2)$, wherein s is the number of vertices in the first collection.

In some embodiments, whether to signal the first collection or the second collection may be adaptively determined based on one or more conditions related to vertex statistics. Examples of one or more conditions related to vertex statistics may include a total number of vertices in the first frame being greater than or equal to a first threshold; a number of duplicate vertices in the first collection being greater than or equal to a second threshold; and a ratio of the number of duplicate vertices and the total number of vertices being greater than or equal to a third threshold.

The techniques, described above, can be implemented as computer software using computer-readable instructions and physically stored in one or more computer-readable media. For example, FIG. 6 shows a computer system 600 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
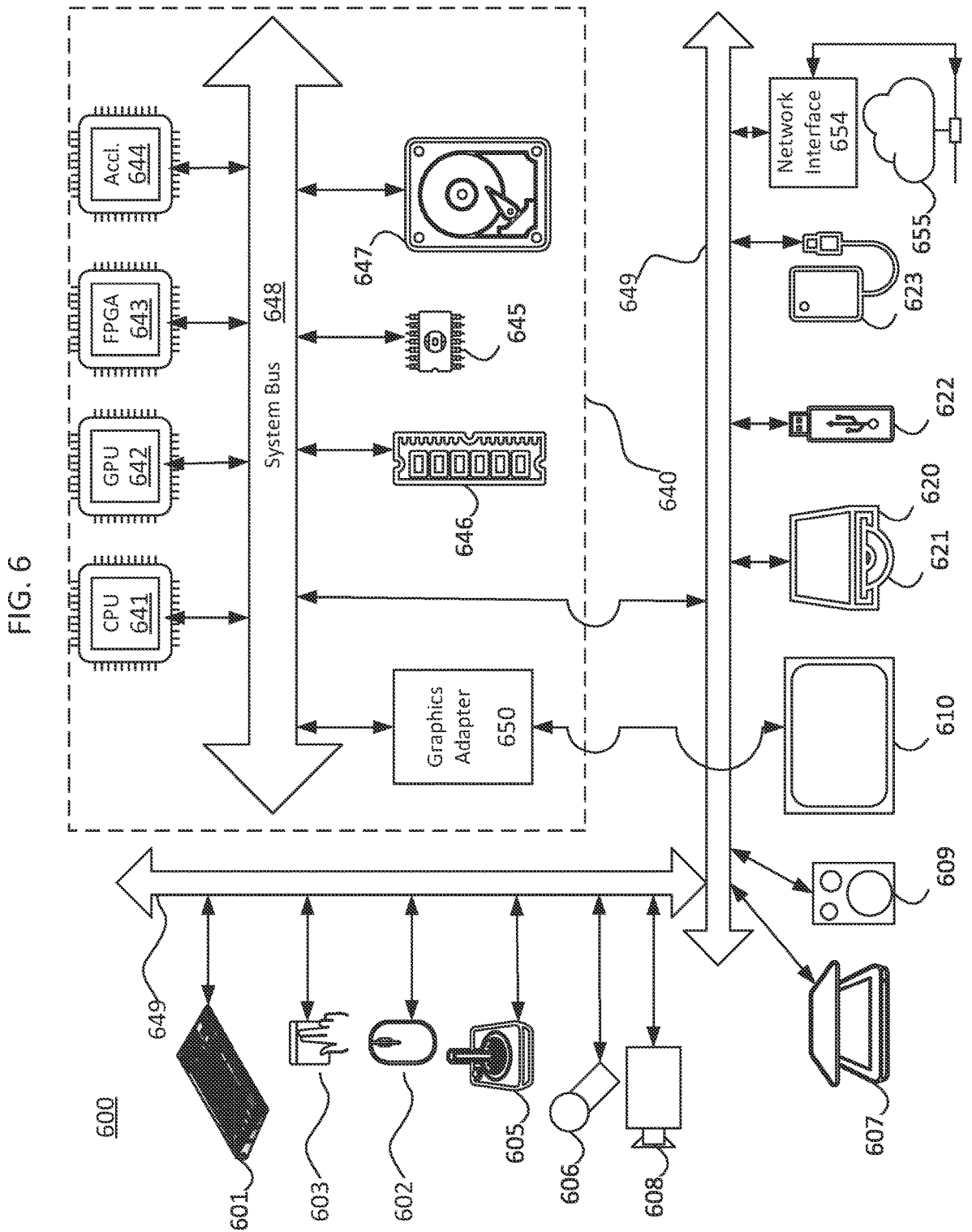
FIG. 6 is a diagram of a computer system suitable for implementing embodiments.

The components shown in FIG. 6 for computer system 600 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data glove, or joystick 605, but there can also be tactile feedback devices that do not serve as input devices). For example, such devices may be audio output devices (such as: speakers 609, headphones (not depicted)), visual output devices (such as screens 610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 649 (such as, for example USB ports of the computer system 600; others are commonly integrated into the core of the computer system 600 by attachment to a system bus as described below (for example Ethernet interface into a PC computer system or cellular network interface into a smartphone computer system). Using any of these networks, computer system 600 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 655. Certain protocols and protocol stacks can be used on each of those networks and network interfaces as described above.

Aforementioned human interface devices, human-accessible storage devices, and network interfaces 654 can be attached to a core 640 of the computer system 600.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory 646, internal mass storage such as internal non-user accessible hard drives, SSDs, and the like 647, may be connected through a system bus 648. In some computer systems, the system bus 648 can be accessible in the form of one or more physical plugs to enable extensions by additional CPUs, GPU, and the like. The peripheral devices can be attached either directly to the core's system bus 648, or through a peripheral bus 649. Architectures for a peripheral bus include PCI, USB, and the like. A graphics adapter 650 may be included in the core 640.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 600, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding, the method being executed by at least one processor, the method comprising:
   receiving volumetric data of at least one three-dimensional (3D) content;
   determining a first collection of vertices in a first frame of the volumetric data using a mapping function, the first collection of vertices comprising one or more duplicate vertices, wherein the one or more duplicate vertices comprises first vertex indices of vertices in the first frame that have a same position as respective reference vertices in a reference frame;

determining a second collection of vertices among the first collection, the second collection of vertices comprising one or more non-skippable duplicate vertices among the first collection, wherein the one or more non-skippable duplicate vertices comprises second vertex indices of vertices in the first frame that do not have same positions in the reference frame; and signaling the second collection and a number of vertices in the second collection.

2. The method of claim 1, wherein the number of vertices in the second collection is coded using fixed length coding.

3. The method of claim 2, wherein the fixed length is a length of b+1 bits, wherein b is an integer less than, equal to, or greater than $\log_2(s)$, wherein s is the number of vertices in the first collection.

4. The method of claim 1, wherein the second collection is coded using fixed length coding.

5. The method of claim 4, wherein the fixed length is a length of B+1 bits, wherein B is an integer less than, equal to, or greater than $\log_2(s-2)$, wherein s is the number of vertices in the first collection.

6. The method of claim 1, wherein the method further comprises:

adaptively determining whether to signal the first collection or the second collection based on one or more conditions related to vertex statistics.

7. The method of claim 6, wherein the one or more conditions related to vertex statistics comprise one of:

a total number of vertices in the first frame being greater than or equal to a first threshold;

a number of duplicate vertices in the first collection being greater than or equal to a second threshold; and a ratio of the number of duplicate vertices and the total number of vertices being greater than or equal to a third threshold.

8. An apparatus for video encoding, the apparatus comprising:

at least one memory configured to store computer program code;

at least one processor configured to access the computer program code and operate as instructed by the computer program code, the computer program code including:

receiving code configured to cause the at least one processor to receive volumetric data of at least one three-dimensional (3D) content;

first determining code configured to cause the at least one processor to determine a first collection of vertices in a first frame of the volumetric data using a mapping function, the first collection of vertices comprising one or more duplicate vertices, wherein the one or more duplicate vertices comprises first vertex indices of vertices in the first frame that have a same position as respective reference vertices in a reference frame;

second determining code configured to cause the at least one processor to determine a second collection of vertices among the first collection, the second collection of vertices comprising one or more non-skippable duplicate vertices among the first collection, wherein the one or more non-skippable duplicate vertices comprises second vertex indices of vertices in the first frame that do not have same positions in the first frame and the reference frame; and signaling code configured to cause the at least one processor to signal the second collection and a number of vertices in the second collection.

9. The apparatus of claim 8, wherein the number of vertices in the second collection is coded using fixed length coding.

10. The apparatus of claim 9, wherein the fixed length is a length of b+1 bits, wherein b is an integer less than, equal to, or greater than $\log_2(s)$, wherein s is the number of vertices in the first collection.

11. The apparatus of claim 8, wherein the second collection is coded using fixed length coding.

12. The apparatus of claim 11, wherein the fixed length is a length of B+1 bits, wherein B is an integer less than, equal to, or greater than $\log_2(s-2)$, wherein s is the number of vertices in the first collection.

13. The apparatus of claim 8, wherein the program code further comprises:

adaptively determining code configured to cause the at least one processor to determine whether to signal the first collection or the second collection based on one or more conditions related to vertex statistics.

14. The apparatus of claim 13, wherein the one or more conditions related to vertex statistics comprise one of:

a total number of vertices in the first frame being greater than or equal to a first threshold;

a number of duplicate vertices in the first collection being greater than or equal to a second threshold; and a ratio of the number of duplicate vertices and the total number of vertices being greater than or equal to a third threshold.

15. A non-transitory computer readable medium storing a program causing at least one processor to:

receive volumetric data of at least one three-dimensional (3D) content;

determine a first collection of vertices in a first frame of the volumetric data using a mapping function, the first collection of vertices comprising one or more duplicate vertices, wherein the one or more duplicate vertices comprises first vertex indices of vertices in the first frame that have a same position as respective reference vertices in a reference frame;

determine a second collection of vertices among the first collection, the second collection of vertices comprising one or more non-skippable duplicate vertices among the first collection, wherein the one or more non-skippable duplicate vertices comprises second vertex indices of vertices in the first frame that do not have same positions in the first frame and the reference frame; and signal the second collection and a number of vertices in the second collection.

16. The non-transitory computer readable medium of claim 15, wherein the number of vertices in the second collection is coded using fixed length coding.

17. The non-transitory computer readable medium of claim 16, wherein the fixed length is a length of b+1 bits, wherein b is an integer less than, equal to, or greater than $\log_2(s)$, wherein s is the number of vertices in the first collection.

18. The non-transitory computer readable medium of claim 15, wherein the second collection is coded using fixed length coding.

19. The non-transitory computer readable medium of claim 18, wherein the fixed length is a length of B+1 bits, wherein B is an integer less than, equal to, or greater than $\log_2(s-2)$, wherein s is the number of vertices in the first collection.

20. The non-transitory computer readable medium of claim 15, wherein the stored program code further causes the at least one processor to:

adaptively determine whether to signal the first collection or the second collection based on one or more conditions related to vertex statistics.

* * * * *